Figure 5:
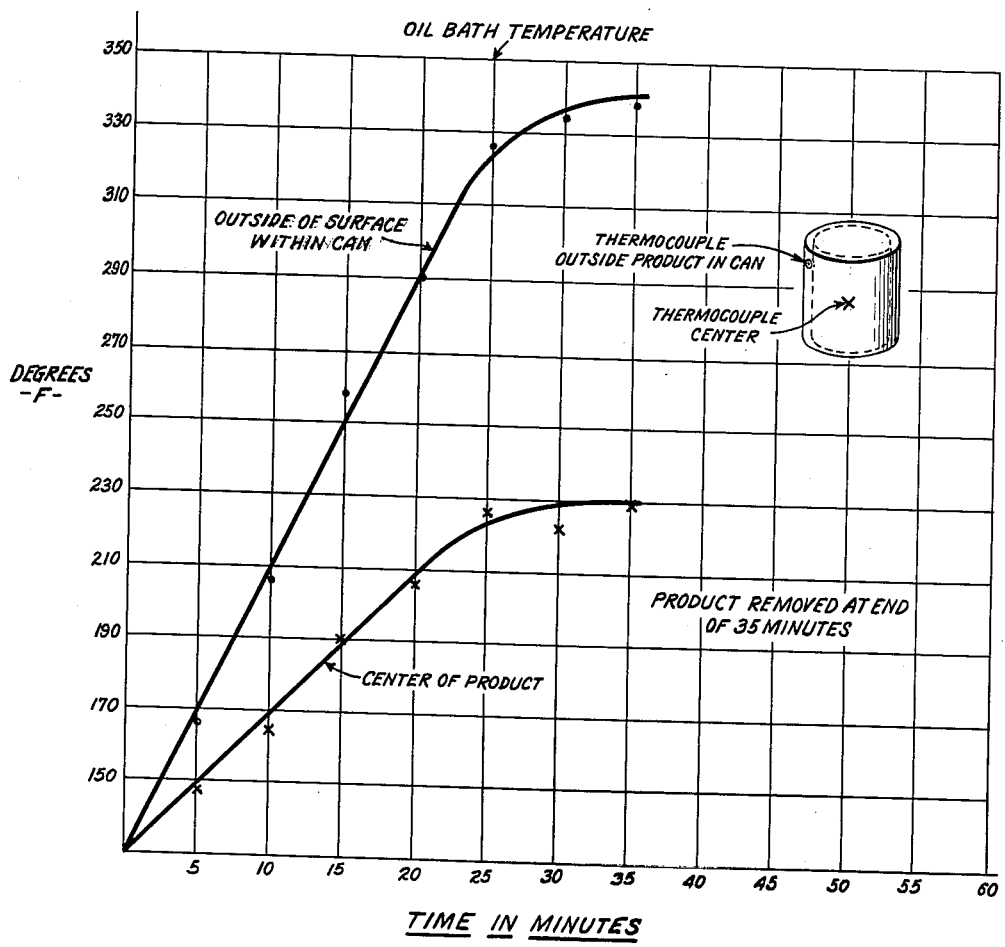

Nov. 13, 1962 H. S. POLIN 3,063,846
PROCESS OF BAKING IN-CAN BAKED PRODUCTS
Filed July 12, 1955 3 Sheets-Sheet 1
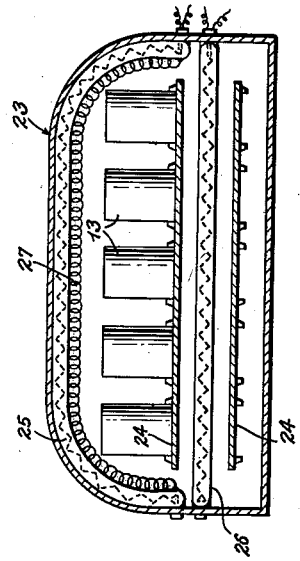
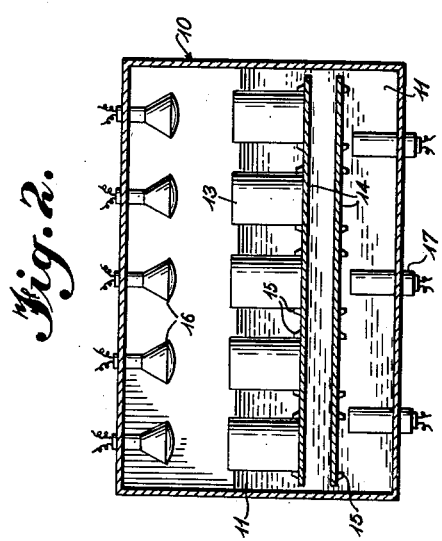
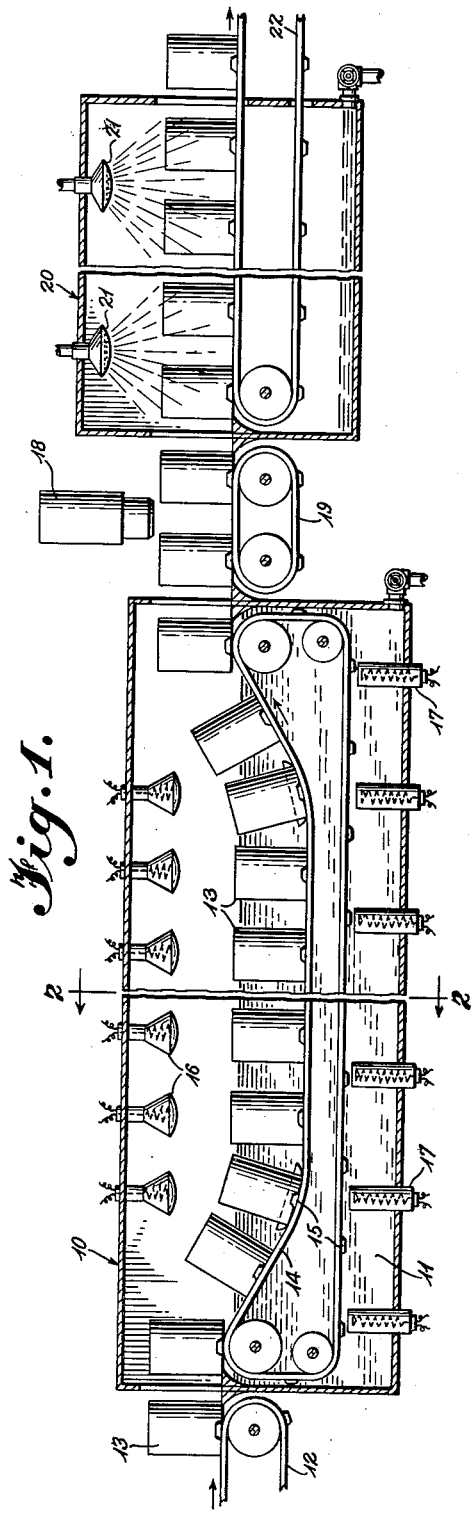
INVENTOR
*Herbert S. Polin*
BY *Stevens, Davis, Miller and Mosher*
ATTORNEYS

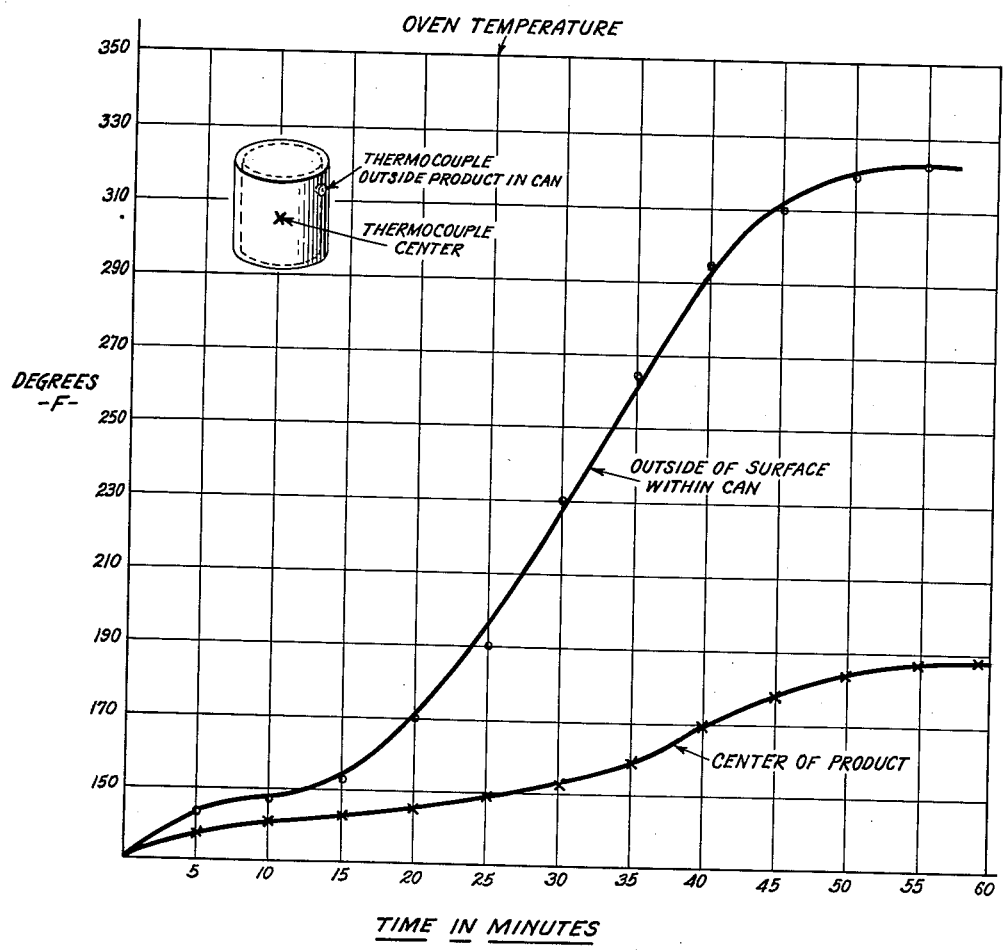

Nov. 13, 1962 H. S. POLIN 3,063,846
PROCESS OF BAKING IN-CAN BAKED PRODUCTS
Filed July 12, 1955 3 Sheets-Sheet 3

INVENTOR
Herbert S. Polin
BY Stevens, Davis, Miller and Mosher
ATTORNEYS 3,063,846
PROCESS OF BAKING IN-CAN BAKED PRODUCTS
Herbert S. Polin, Rio de Janeiro, Brazil, assignor to Vacuum Baking Corporation, New York, N.Y., a corporation of New York
Filed July 12, 1955, Ser. No. 521,577
3 Claims. (Cl. 99—182)

This invention relates to a continuous baking process. More particularly, the invention relates to continuous baking in containers passing through a fluid medium capable of effecting a uniform heat transfer throughout the baking cycle.

The baking art until recently has been practiced as an essentially batch process, that is, dry and wet ingredients comprising the product have been mixed in a vessel of a size necessary to accommodate the selected proportions, then passed to the forming device or baking container, and then to an oven of a size to accommodate the total batch.

In the advancements in the art which led to in-can baked products, bakery practices have been so modernized as to permit continuous production-line methods to be used. All elements of composition can thus be fed into a continuous mixer whereby the product of the mixer passes to a continuous depositing device which fills containers passing before it. After preliminary sealing of the filled containers, they enter continuously into a baking cycle and then pass through a continuous cooling, labeling and packaging cycle. Thus, a constant flow of raw material is entering the first stage of the process and an equal flow of processed, packaged product is leaving the last stage of the production line.

It is an object of this invention to provide a controllable heat transfer medium so as to effect uniform baking of products in containers passing continuously through the heat transfer medium.

A further object is to effect control of the thermal gradient between the center of the baked product and its outside surface, so as to produce a uniform, baked product.

A still further object is to effect uniform baking in a container by partially submerging the container in an oil bath heat transfer medium.

Another object is to effect uniform baking in a container by heat processing in a heated atmosphere in which the ratio of surrounding space to cubic contents of product at any instant during the baking cycle is not more than 1 to 1.

Additional objects will become apparent from examination of the following description and claims.

The invention will be described further in connection with the accompanying drawings which are to be considered as an exemplification of the invention and do not constitute limitations thereof.

In the drawings:

FIGURE 1 is a side elevational view showing the fluid bath heat processing and cooling chambers through which the baking containers pass during the baking and cooling cycle, FIGURE 2 is a cross-sectional end elevational view, taken along the line 2—2 of FIGURE 1, showing the baking containers in the fluid bath during the baking cycle, FIGURE 3 is a cross-sectional end view of a tunnel in which the ratio of free heating space to cubic content of product is not more than 1 to 1, FIGURE 4 is a graphic illustration of the thermal gradient between the center of the baked product and the exterior thereof during the baking cycle in a conventional type baking oven, and FIGURE 5 is a graphic illustration of the thermal gradient between the center of the baked product and the exterior thereof during the baking cycle performed in a heat transfer oil bath.

In accordance with the invention, reference numeral 10 indicates a baking chamber containing a heat transfer fluid 11, as shown in FIG. 1. A continuous conveyor belt 12 feeds cans 13 containing dough to be baked to conveyor belt 14 where transfer is effected, and the cans are then conveyed into the heat transfer fluid 11. Suitable holding devices 15 firmly keep the cans riding on the conveyor belt during the heat processing cycle. The level of the heat transfer fluid is adjusted so that it surrounds practically all of the can up to within a small distance from the top.

Above the tops of the moving cans 13 is a bank of spaced heaters 16 which maintain the space above the fluid at approximately the bath temperature. Positioned at spaced intervals in the heated bath 11 are a series of heaters 17 which control the temperature of the fluid and allow for variance of the baking temperature during the baking cycle.

After the cans pass through the baking cycle, they are conveyed under a sealer 18 by a conveyor belt 19 where the baked product in the can is hermetically sealed. The cans are then passed through a cooling chamber 20, see FIGURE 1, on conveyor belt 22 where they are water-cooled from spray nozzles 21. After cooling, the product is ready for labeling and packaging.

An alternate type of continuous baking operation is shown in FIGURE 3 in which 23 represents the oven chamber with cans 13 conveyed on a conveyor belt 24. The heat is supplied by heating elements 25, located around the dome of the oven, and 26, located under the conveyor belt 24. Also located around the dome of the oven are a series of high frequency elements which assist in the heat processing of the internal portion of the food to be processed in the containers. It is to be understood that the cans 13, after passing through the oven to complete a baking cycle, pass to a sealer where the cans containing the baked product are hermetically sealed. From the sealer the cans are conveyed to a cooling chamber, as shown in FIGURE 1, where they are cooled and made ready for labeling and packaging.

In operation, the cans containing raw dough are conveyed on the moving belt 14 and passed into a heated atmosphere, preferably a fluid such as oil, which may be heated from 150° C. to 250° C. The belt passes through a space, the length of which corresponds to a required baking cycle, at a selected temperature for the product to be processed. The oil bath has heat zones progressing higher or lower in temperature than the initial temperature, or thermal zones may alternate in the passage of approximately 100 feet or more as the requirements of the product demand. The rate of advance of the belt may be adjustable to accommodate various types of products. The level of the can or other packaging containing the product held on the moving belt is adjusted so that its open end is always above the level of the oil in the bath, thus preventing oil from entering into the container.

As an example of a product entering this cycle, the dough (6½ oz.), comprising a mixture for a pound cake, having been deposited in a can 3 inches in diameter and 4½ inches in height, is preliminarily cap-sealed and placed upon the moving belt which carries it into the oil bath maintained at a temperature of 160° C. The belt moves at the rate of 2 feet per minute and at the end of 10 minutes enters a thermal zone, the temperature of which is 180° C., which temperature persists to the end of the baking cycle which terminates in a transit time of 35 minutes. At this point the can is passed to the sealer and then directly to a cooling cycle which may be a battery of cold water sprays above a moving belt or a tank of rapidly circulating water designed to cool the product to a temperature of 30° C. within approximately 15 minutes from the end of the heat cycle. The rapid cooling acting upon the can which has been hermetically sealed while at a temperature above 100° C. produces a progressive vacuum and at 30° C. a vacuum of approximately 29 inches of mercury is registered.

Heretofore, a baking cycle has depended upon heat transfer through an air medium and through the thermal barriers comprising the container and liner to bring the packaged product to the temperature required for baking. Measurements of thermal lag in this process have shown that the center portion of the baked product does not reach a temperature of influence for more than 50% of a standard baking period. In the instance of oil bath baking, the thermal lag is reduced sharply and the influence of temperature is very much more quickly delivered throughout the bulk of the product. This results in a more uniform baking and a consequent better-textured, better-appearing product.

It has been found advantageous to end the baking cycle at a higher temperature than the initial applied temperature to prevent the rapid formation of a crust which itself acts as a thermal insulator of the center structure of the product. Additional acceleration of the baking process can be accomplished by applying high frequency heating in combination with other types of heating.

Since the top of the can or package remains slightly above the surface of the oil bath, it tends to be substantially lower in temperature than the immersed section. To correct this condition and to maintain all parts of the container at the same temperature during the baking cycle, a row of infra-red heating elements, or resistance coils of suitable wattage, are placed above the rows of containers on the belt, and these serve to preserve the thermal equilibrium during baking. Alternatively, high frequency heating may also be applied during the baking cycle, thus hastening the rate of internal baking of the product and materially speeding the baking cycle.

An alternative baking device of substantial advantage over the usual type of oven is a tunnel lined with infra-red heating elements positioned so closely to the moving containers that the air space between heating element and container is of the lowest possible thermal impedance. The ratio of air space to cubic content of product in the tunnel at any instant should not be more than 1 to 1.

Various types of bath substances will suggest themselves to those skilled in the art. The requirements are that it be completely fluid at operating temperatures, that it have no odor and no tendency to smoke at operating temperatures, and that its price be sufficiently low not to constitute an economic prohibition for this application. A class of material answering the requirements stipulated is a hydrogenated vegetable oil which may be a solid at room temperature but which becomes liquid above 100° C. Of this class of material it is necessary that one consider its density with respect to weight of the can or container which must ride a belt at a predicted level in the oil bath. If the can containing the product tends to float in the oil bath, it may be secured to the belt by a variety of mechanical or magnetic or electro-magnetic means. A preferred method for holding the can to the belt at a pre-selected level is to have a series of permanent magnets fixed to the belt at all positions where cans are to be deposited, the size and strength of the magnets being selected so as to permit the cans to be easily forced away from the magnet at the end of the baking cycle. Alternatively, electro-magnets at like positions can be energized by a trip switch device attached to the belt in such way as to release the cans automatically at the conclusion of the cycle.

As an alternative packaging method to replace the tinned can of normal usage, a heavy aluminum foil containing the dough may be preliminarily crimped in such manner that gases evolved in the baking cycle may be permitted to escape. The aluminum package may be gripped by mechanical fingers placed at suitable positions along the belt to mechanically hold each aluminum package at a level in the oil just below the crimping point in the aluminum permitting the gases to escape as the foil package makes its transit through the oil bath. At the conclusion of the oil bath cycle, the crimp in the aluminum package is hermetically sealed and the package is immediately passed to the cooling cycle. The development of the consequent vacuum within the package causes the aluminum to draw tightly against the baked product forming a package of tightly pressed foil conforming to the shape of the baked product.

The advantage in time and the more rapid equilibration of external and internal temperatures of the product at points in the baking cycle are illustrated in curves, FIGURES 4 and 5. The curve in FIGURE 4 shows the thermal lag impressively as the heat transfer surmounts the barriers of air space and interface, can surface and can inner liner. It will be noted that more than one-half of the total time cycle has been used before the center of the product has reached a temperature of the slightest reactivity. It has taken 25 minutes for the inside surface of the container to reach a temperature above the boiling point of water.

The curve in FIGURE 5 shows how much better the temperature rise in the center of the product follows the rapid temperature rise registered in the oil bath heating system. The whole baking cycle is compressed into two-thirds of the time required in the conventional convection current or forced draft oven.

The product packaged in aluminum foil follows thermal rise faster under both conventional oven baking conditions and in the oil bath, but in the oil bath, the advantage of using high thermal efficiency aluminum foil is markedly greater. The product resulting from this system of baking has properties of texture uniformity, lightness and color impossible to obtain in mass production methods using conventional equipment.

It is to be understood that, although the invention has been illustrated as a continuous baking process, the process of this invention may be practiced either semi-continuously or batchwise.

It is to be further understood that the invention is limited only to the appendant claims, and various changes may be made in the details of construction without departing from the invention or sacrificing any of the advantages thereof.

What is claimed is:

1. The process of baking in-can baked products in containers which comprises filling open-end containers with dough to be baked, lidding said containers to close said open end, crimping the lid to said containers to partially seal the contents therein, conveying said containers into a confined heating area having a liquid heating bath and a gaseous heated zone thereabove both maintained at a constant temperature, immersing said containers in said liquid bath so that the bottom and substantially all of the side areas of the containers are within said liquid bath, conveying said immersed containers through said liquid bath until a baking cycle within the containers has been completed, hermetically sealing said containers immediately after emergence from said liquid bath, and immediately cooling said containers to produce a vacuum therein.

2. The process of claim 1 in which high frequency heating is employed to maintain the top of said containers at a controlled temperature.

3. The process of claim 1 in which ray energy heating is employed to maintain the top of said containers at a controlled temperature.

References Cited in the file of this patent

UNITED STATES PATENTS

| | | |
|---|---|---|
| 769,737 | Gardner | Sept. 13, 1904 |
| 1,015,892 | Jefferson | Jan. 30, 1912 |
| 1,141,599 | Baker | June 1, 1915 |
| 1,377,088 | Martin | May 3, 1921 |
| 1,411,223 | Retzbach | Mar. 28, 1922 |
| 1,709,526 | Dumbleton | Apr. 16, 1929 |
| 1,861,124 | Lorber | May 31, 1932 |
| 1,901,083 | Chapman | Mar. 14, 1933 |
| 2,039,374 | Young | May 5, 1936 |
| 2,271,921 | Luker | Feb. 3, 1942 |
| 2,340,354 | Wells | Feb. 1, 1944 |
| 2,380,134 | Waters | July 10, 1945 |
| 2,398,082 | Cavallito | Apr. 9, 1946 |
| 2,491,687 | Nutt | Dec. 20, 1949 |
| 2,674,536 | Fisher | Apr. 6, 1954 |

OTHER REFERENCES

"Military Specification, Pound Cake, Canned," MIL-P-3234A, September 22, 1952, page 2.

"Military Specification, Bread, Canned," MIL-B-1070A, December 7, 1950, page 3.

"Refrigerating Engineering," February 1954, p. 46 (reprint in 99-1741).

"The Canned Food Reference Manual," 2nd edition, 1943, pub. of the American Can Co. Research Dept., American Can Co. (New York), pp. 72-73.

"Commercial Fruit and Vegetable Products," 3rd edition, 1948, by Cruess, McGraw-Hill Book Co., Inc., New York, p. 112.

"Webster's Collegiate Dictionary," 5th edition, 1948, G. & C. Merriam Co. Publishers (Springfield), p. 79.